US008587596B2

(12) United States Patent
Mejdrich et al.

(10) Patent No.: US 8,587,596 B2
(45) Date of Patent: Nov. 19, 2013

(54) MULTITHREADED SOFTWARE RENDERING PIPELINE WITH DYNAMIC PERFORMANCE-BASED REALLOCATION OF RASTER THREADS

(75) Inventors: Eric O. Mejdrich, Woodinville, WA (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 12/824,727

(22) Filed: Jun. 28, 2010

(65) Prior Publication Data

US 2011/0316864 A1    Dec. 29, 2011

(51) Int. Cl.
    *G06F 15/80*    (2006.01)
(52) U.S. Cl.
    USPC ........... 345/506; 345/505; 345/504; 345/502; 712/28; 718/100
(58) Field of Classification Search
    None
    See application file for complete search history.

(56) References Cited

U.S. PATENT DOCUMENTS

| 6,088,044 | A  | * | 7/2000 | Kwok et al. ................. 345/505 |
| 7,075,541 | B2 | * | 7/2006 | Diard ............................ 345/505 |
| 2003/0043147 | A1 | * | 3/2003 | Heim et al. ................... 345/421 |
| 2008/0088622 | A1 | * | 4/2008 | Shearer ........................ 345/421 |
| 2009/0183167 | A1 | * | 7/2009 | Kupferschmidt et al. .... 718/104 |
| 2009/0231349 | A1 |   | 9/2009 | Mejdrich et al. |

OTHER PUBLICATIONS

Abraham, Frederico et al., "A load-balancing strategy for first-sort distributed rendering," Oct. 2004, Proceedings of the 17th Brazilian Symposium on Computer Graphics and Image Graphics (SIBGRAPI104), pp. 292-299.*

* cited by examiner

*Primary Examiner* — Xiao M. Wu
*Assistant Examiner* — Greg Raburn
(74) *Attorney, Agent, or Firm* — Wood, Herron & Evans, LLP

(57) ABSTRACT

A multithreaded rendering software pipeline architecture dynamically reallocates regions of an image space to raster threads based upon performance data collected by the raster threads. The reallocation of the regions typically includes resizing the regions assigned to particular raster threads and/or reassigning regions to different raster threads to better balance the relative workloads of the raster threads.

23 Claims, 8 Drawing Sheets

US 8,587,596 B2

MULTITHREADED SOFTWARE RENDERING PIPELINE WITH DYNAMIC PERFORMANCE-BASED REALLOCATION OF RASTER THREADS

FIELD OF THE INVENTION

The invention is generally related to data processing, and in particular to graphical imaging processing and rendering.

BACKGROUND OF THE INVENTION

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from several drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

With continued improvements in semiconductor technology in terms of clock speed and increased use of parallelism; however, rasterization becomes viable for more complex images. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Hardware-based pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

As an example, some conventional rasterization engines used in graphics processing units attempt to increase throughput by partitioning an image space into different regions and assigning those regions to different threads running on different processing elements or units so that the different regions of the image space may be rendered in parallel. It has been found, however, that the assignment of threads to regions of an image space can have a significant amount of impact on overall throughput, and moreover, that selecting an optimum assignment that maximizes overall throughput is often difficult to calculate, particularly in dynamic and real time rendering environments where the content of a scene may vary significantly over time.

In particular, in gaming and other real-time environments, objects can move around a scene, resulting in the amount of work required to render a particular region of an image space changing from image frame to image frame. With a static allocation of regions to a pool of threads, the workloads of individual threads may vary considerably, with threads assigned to regions with numerous and/or complex objects generally having greater workloads than threads assigned to more sparse and less complex regions. As a result, some threads may not be able to complete their assigned work in a timely fashion, while other threads may be underutilized.

Therefore, a need exists in the art for a manner of efficiently allocating threads used in rasterization to regions of an image space in a dynamic image processing environment.

SUMMARY OF THE INVENTION

The invention addresses these and other problems associated with the prior art by providing a multithreaded rendering software pipeline architecture that dynamically reallocates regions of an image space to threads utilized in rasterization (hereinafter referred to as "raster threads"), based upon performance data collected by the raster threads. The reallocation of the regions typically includes resizing the regions assigned to particular raster threads and/or reassigning regions to different raster threads to better balance the relative workloads of the raster threads.

Therefore, consistent with one aspect of the invention, an image may be rendered using a multithreaded rendering software pipeline of the type using a plurality of parallel threads of execution. The image may be rendered by generating a raster-based image using a plurality of raster threads from a rasterization backend implemented in the multithreaded rendering software pipeline, where each raster thread is allocated at least one region of an image space for the raster-based image, and dynamically reallocating the regions allocated to the plurality of raster threads based upon performance data collected from the plurality of raster threads.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a multithreaded rendering software pipeline architecture that dynamically reallocates regions of an image space to raster threads based upon performance data collected by the raster threads. Within this context, a raster thread may be considered to be a hardware-based thread of execution that is utilized in connection with rasterization, e.g., in a rasterizer stage, pixel shader stage or texturizer stage of a rasterization-based rendering pipeline. In addition, a region of an image space may be considered to be an area of the two dimensional space from which an image is rendered using rasterization.

The reallocation of the regions typically includes resizing the regions assigned to particular raster threads and/or reassigning regions to different raster threads to better balance the relative workloads of the raster threads. In the former instance, for example, regions may be resizable such that each raster thread is allocated a resizable region. In the latter instance, regions may be regular shapes such as square or rectangular tiles that may be used as building blocks from which to build larger areas to which particular raster threads are assigned.

Other variations and modifications will be apparent to one of ordinary skill in the art. Therefore, the invention is not limited to the specific implementations discussed herein.

Hardware and Software Environment

Figure 1:
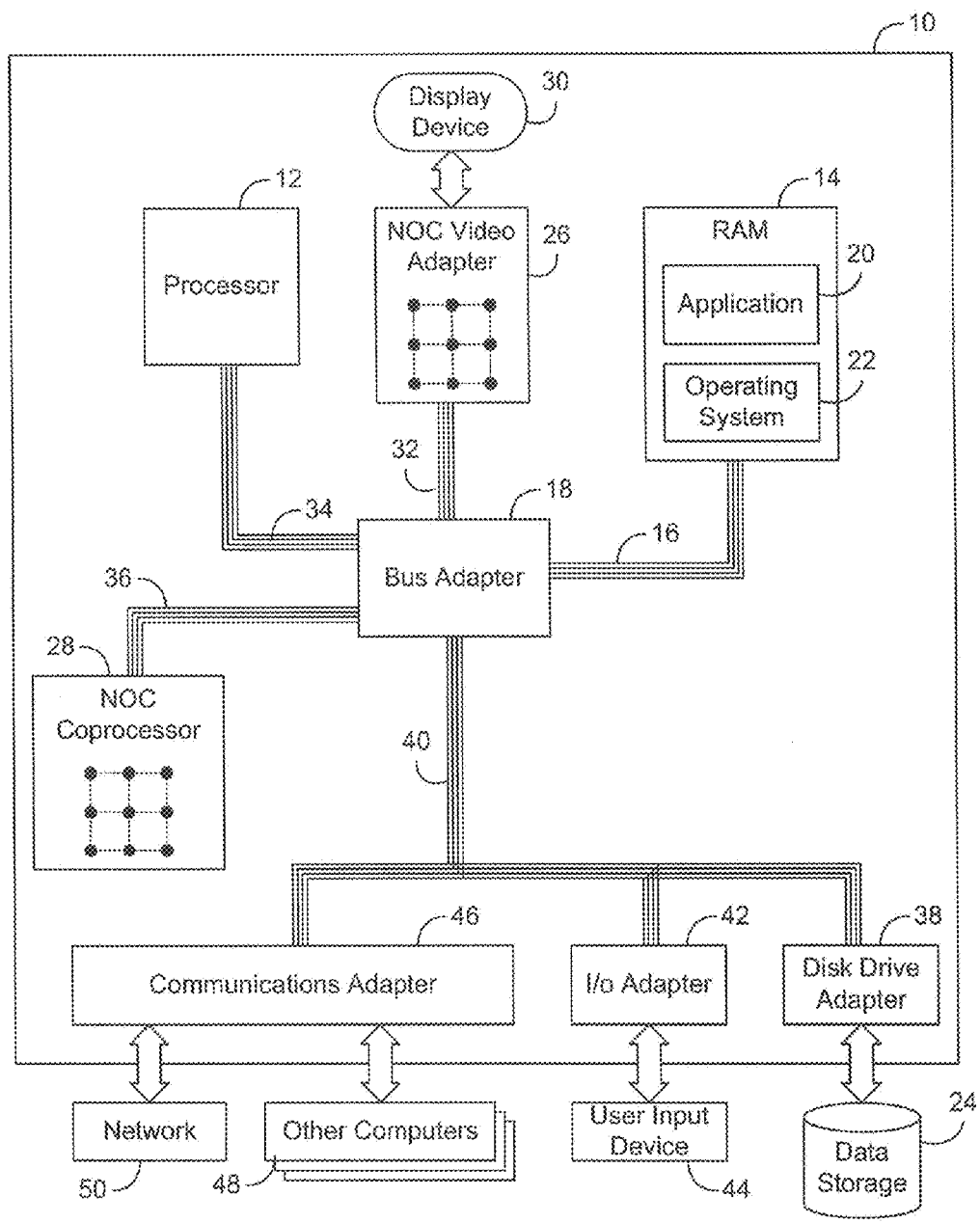
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
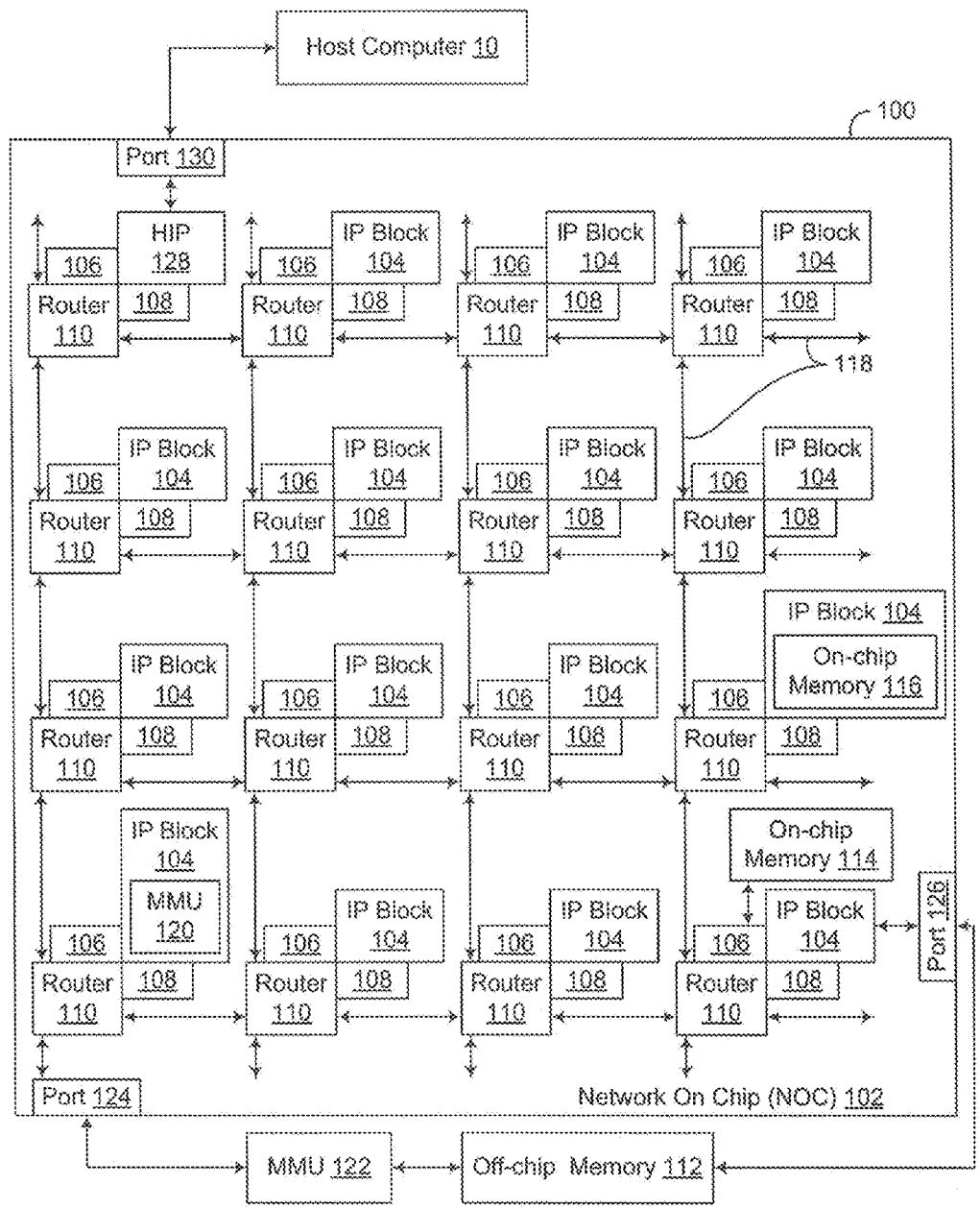
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
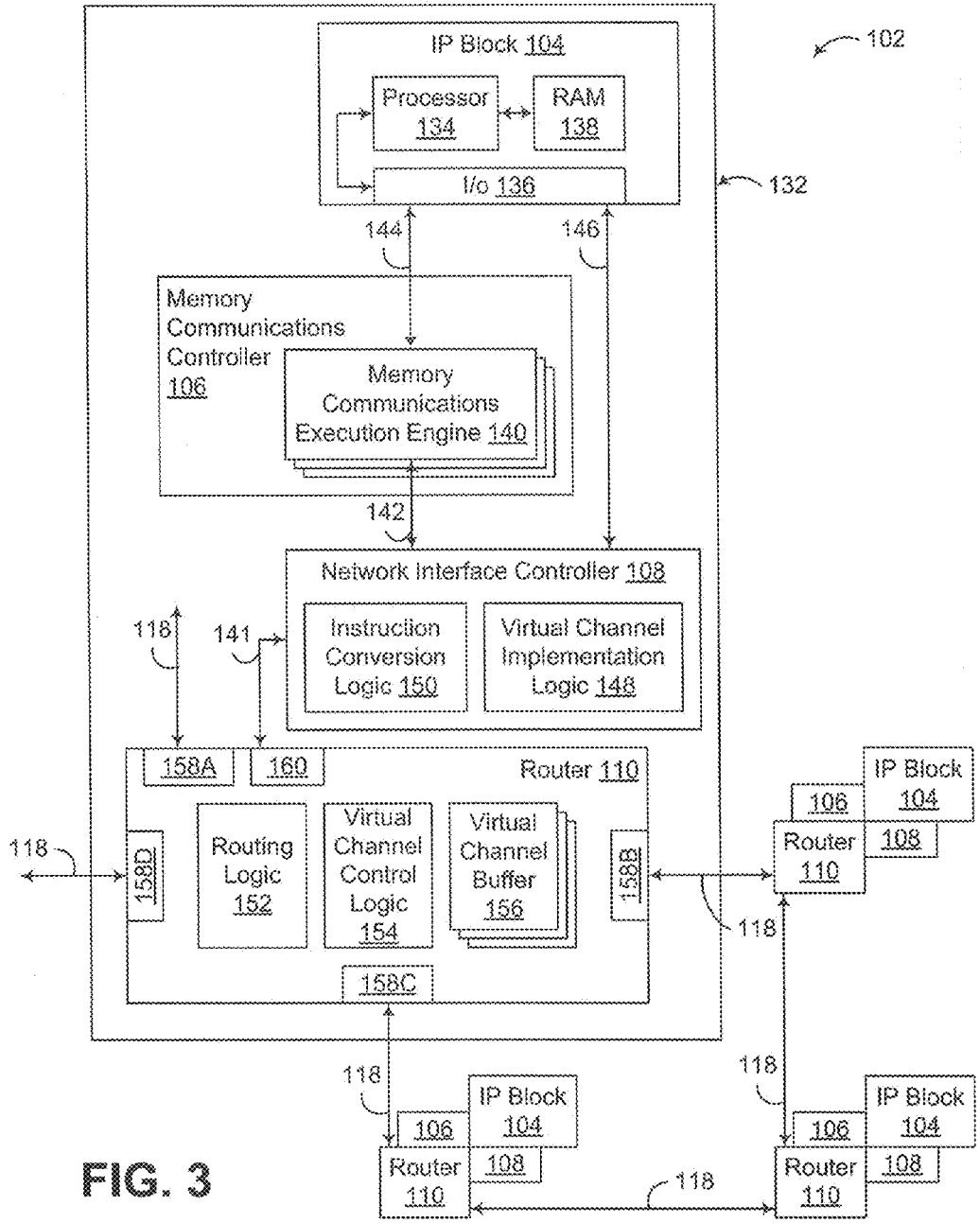
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 1588 and 158D are termed horizontal ports.

Figure 4:
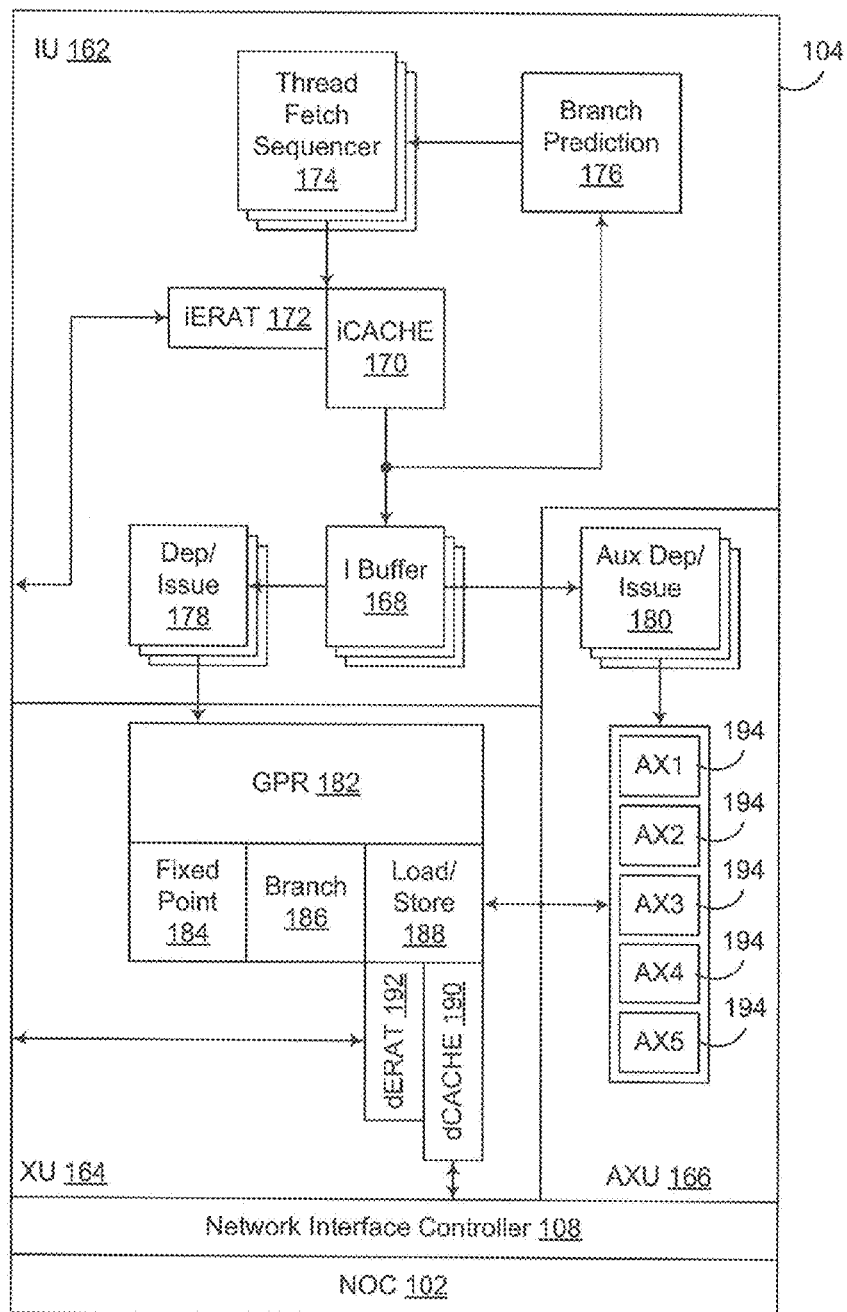
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Software Pipelining

Figure 5:
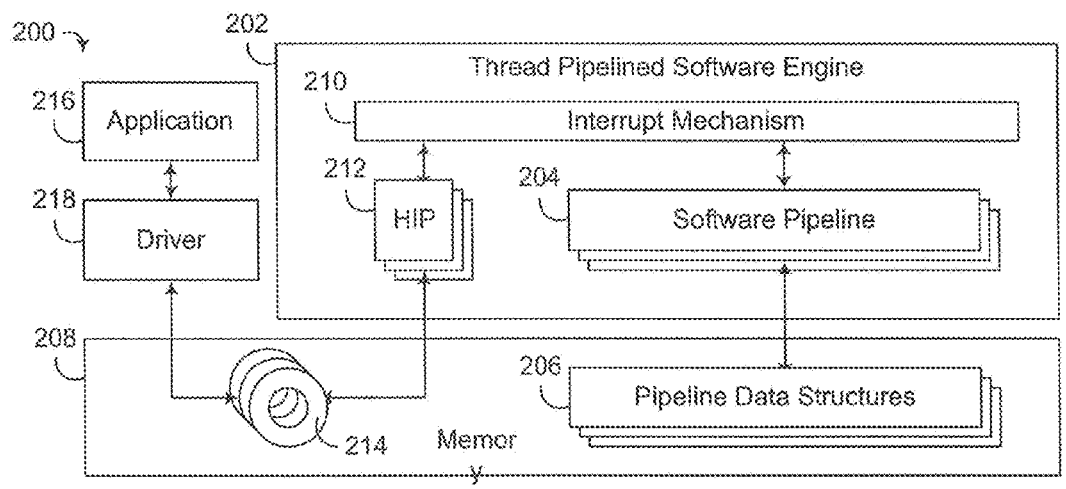
FIG. 5 is a block diagram of a thread pipelined software engine suitable for implementation in the NOC of FIG. 2.

Turning now to FIG. 5, NOC 102 may be used in some embodiments to implement a software-based pipeline. In particular, FIG. 5 illustrates an exemplary processing unit 200 incorporating a thread pipelined software engine 202 that may be used to implement and execute one or more software pipelines 204 on top of an NOC architecture. Each pipeline 204 is typically allocated one or more data structures 206 in a shared memory 208 to enable different stages of a pipeline to exchange data. Furthermore, an interrupt mechanism 210 is provided to enable stages of a pipeline to notify one another of pending work to be performed.

One or more host interface processors (HIP's) 212 are also provided in engine 202 to handle the issue of work to software pipelines 204. One or more push buffers 214 are provided to interface each HIP 212 with a software application 216 and driver 218, which are resident outside of the engine. In order to initiate work in a pipeline, a software application 216 issues requests through an appropriate driver 218 in the form of API calls, which then generates appropriate requests for the HIP and stores the requests in a push buffer 214. The HIP 212 for the relevant pipeline pulls work requests off of push buffer 214 and initiates processing of the request by the associated pipeline.

In the illustrated embodiment, and as implemented on a NOC 102, a software pipeline 204 implements a function that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block 104 of a NOC 102. The stages are flexibly configurable in that each stage may support multiple instances of the stage, so that a pipeline may be scaled by instantiating additional instances of a stage as needed depending on workload. Because each stage is implemented by computer program instructions executing on an IP block 104 of a NOC 102, each stage is capable of accessing addressed memory through a memory communications controller 106. At least one stage, moreover, is capable of sending network-address based communications among other stages, where the network-address based communications maintain packet order.

The network-address based communications, for example, may be implemented using "inboxes" in each stage that receive data and/or commands from preceding stages in the pipeline. The network-address based communications maintain packet order, and are communications of a same type which are able to flow through the same virtual channel as described above. Each packet in such communications is routed by a router 110 in the manner described above, entering and leaving a virtual channel buffer in sequence, in FIFO order, thereby maintaining strict packet order and preserving message integrity.

Each stage implements a producer/consumer relationship with a next stage. The first stage receives work instructions and work piece data through a HIP 212, carries out its designated data processing tasks on the work piece, produces output data, and sends the produced output data to the next stage in the pipeline, which consumes the produced output data from the first stage by carrying out its designated data processing tasks on the produced output data from the first stage, thereby producing output data that is subsequently sent on to a next stage in the pipeline. This sequence of operations continues to the last stage of the pipeline, which then stores its produced output data in an output data structure for eventual return through the HIP 212 to the originating application 216.

Figure 6:
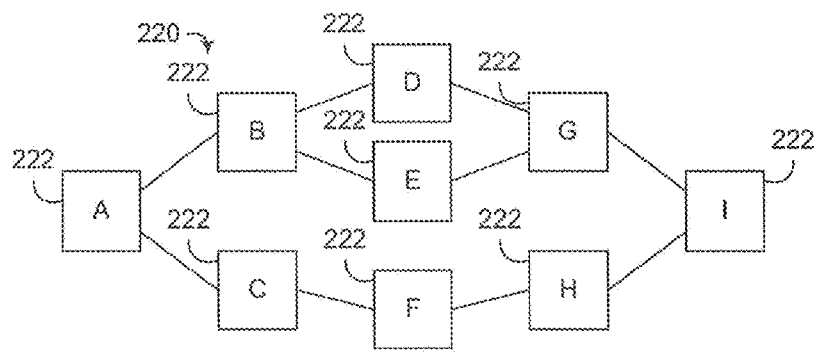
FIG. 6 is a block diagram of an exemplary software pipeline suitable for implementation in the thread pipelined software engine of FIG. 5.

The arrangement of stages in a pipeline may vary in different embodiments, as well as for performing different functions in different applications. FIG. 6, for example, illustrates an exemplary software pipeline 220 including a plurality of stage instances 222, also separately designated as instances A-I, each of which representing a thread of execution implemented on an IP block in NOC 102. The stage instances 222 are arranged in pipeline 220 into five stages, a first stage with instance A, a second stage with instances B and C, a third stage with instances D, E and F, a fourth stage with instances G and H, and a fifth stage with instance I. As can be seen from FIG. 6, instances may have a one-to-one, a one-to-many and/or a many-to-one relationship with other instances in the pipeline. Instances may operate collectively with one another in a particular stage to perform parallel tasks and share the workload, thus improving the overall throughput of the stage in performing the task. Instances in a stage may also perform different tasks from one another to enable the parallel performance of different tasks. Instances can supply data to more than one instance, while other instances may collect data and process data from multiple instances.

In the illustrated embodiment, each instance of each stage of a pipeline is typically implemented as an application-level module of computer program instructions executed on a separate IP block on a NOC, and each stage is assigned to a thread of execution on an IP block of a NOC. Each stage is assigned a stage ID, and each instance of a stage is assigned an identifier. HIP 212 (FIG. 5) typically sets up the pipeline by configuring each stage with a desired number of instances, with the network location of each instance of each stage provided to other instances of other stages to enable each instance to send its resultant workload to the proper instance in the next stage. earlier and/or later stage 3 to which an instance of stage 2 is authorized to send its resultant workload. Multiple instances may be assigned to a particular stage to provide additional processing resources relative to other stages, e.g., so work flows through the pipeline as efficiently as possible, and no single stage presents a bottleneck to performance. It will also be appreciated that workload monitoring may be performed during runtime, and that instances may be dynamically added or removed from a stage as needed for balancing the load among the stages of the pipeline.

Each stage is configured with a stage ID for each instance of a next stage, which may also include the number of instances in the next stage as well as the network location of each instance of that. Configuring a stage with IDs for instances of a next stage provides the stage with the information needed to carry out load balancing across stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a separate monitoring application that in turn is installed and running on another thread of execution on an IP block or HIP. Performance statistics can include, for example, time required to complete a data processing task, a number of data processing tasks completed within a particular time period, and so on, as will occur to those of skill in the art. Instantiating a number of instances of each stage in dependence upon the performance of one or more of the stages can be carried out by instantiating, by an HIP, a new instance of a stage when monitored performance indicates a need for a new instance.

Dynamic Performance-Based Reallocation of Raster Threads

Figure 7:
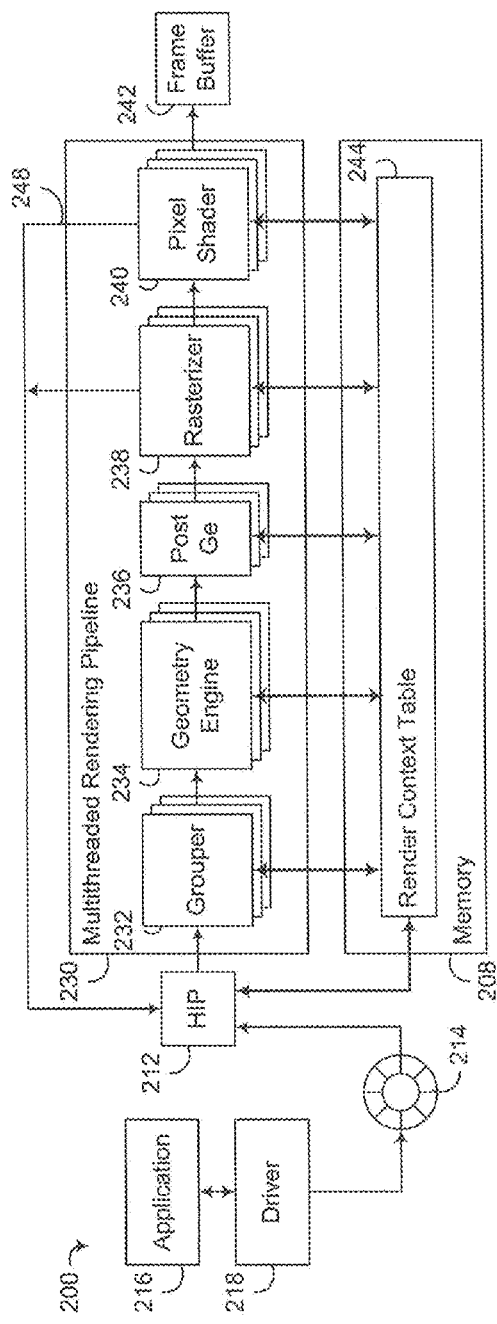
FIG. 7 is a block diagram of a processing unit including an exemplary multithreaded rendering pipeline incorporating dynamic performance-based reallocation of raster threads consistent with the invention, and suitable for implementation in the thread pipelined software engine of FIG. 5.

Now turning to FIG. 7, this figure illustrates an implementation of processing unit 200 configured to implement a multithreaded rendering pipeline architecture consistent with the invention. In particular, FIG. 7 illustrates a multithreaded rendering pipeline 230 incorporating a grouper stage with one or more grouper units 232, a geometry engine stage with one or more geometry engines 234, a post geometry engine (Post GE) stage including one or more post GE units 236, a rasterizer stage including one or more rasterizers 238 and pixel shading stage including one or more pixel shaders 240.

Each processing element or unit 232, 234, 236, 238, 240 is desirably implemented within an IP block in a node in NOC 102, with each such unit assigned at least one dedicated hardware thread. Each unit is typically disposed on a separate node, although in other embodiments multiple units may be disposed in a single node. Moreover, each unit may be allocated multiple threads of execution in some embodiments. Time-slice based software multithreading may also be implemented in some embodiments, although it is desirable in the illustrated embodiment that multiple units not be wholly implemented on the same hardware-based thread.

Each grouper unit 232 is used to group data for streaming down the pipeline, e.g., by pulling related vertices from an object array. Each geometry engine 234 is typically used to perform object transformations and generate the geometric primitives, while each post GE unit 236 is configured to perform post processing of the geometric primitives such as perspective divides, culling, sorting, breaking up geometry, etc.

Rasterizers 238 and Pixel shaders 240 may be considered part of a rasterization backend, and, within the context of the dynamic reallocation technique disclosed herein, each rasterizer 238 and pixel shader 240 may be considered to be a raster thread for the purposes of the invention. It will be appreciated that in some embodiments, dynamic reallocation may be applied solely within the rasterizer 238 stage or the pixel shader 240 stage.

Each rasterizer 238 is configured to operate as a pixel fragment generator to generate a stream of pixel fragment data sets that characterize one pixel, a fraction of one pixel or more than one pixel from a primitive input to the rasterizer. Among other operations, each rasterizer typically performs a scan line conversion of coordinates in a primitive to (u, v) texture coordinates in a texture to be applied to the primitive. Each pixel shader 240, in turn, takes the pixel fragment data sets and applies or updates the colors of one or more pixels in a frame buffer 242, typically using texture filtering and other shading techniques.

It will be appreciated that the specific operations performed by units 232, 234, 236, 238 and 240 in terms of implementing a raster-based rendering pipeline that renders image data for a scene may incorporate any number of known rendering techniques, enhancements and algorithms, and that the implementation of such techniques in the appropriate units would be well within the abilities of one of ordinary skill in the art having the benefit of the instant disclosure. It will also be appreciated that other rendering algorithms may also be implemented in a multithreaded pipeline consistent with the invention, and that such techniques may rely on different and/or additional pipeline stages not illustrated in FIG. 7. Therefore, the invention is not limited to the particular raster-based rendering pipeline architecture represented in FIG. 7.

Commands and data may be passed from stage to stage in pipeline 230, while some data, including shared context or state data, is not passed directly from stage to stage, but is instead maintained in shared memory 208 and accessed by each stage as needed. Among this shared data may be included a rolling context data structure, implemented in FIG. 7 as a render context table 244, and which is described in greater detail in U.S. patent application Ser. No. 12/046,573, filed by the same inventors as for the instant application, published as U.S. Pub. No. 2009/0231349, and assigned to the same assignee as the instant application, which is incorporated by reference herein.

In addition, for the purposes of dynamic performance-based reallocation of raster threads, rasterizers 238 and/or pixel shaders 240 are capable of passing performance data (designated at 248) back to HIP 212 to enable HIP to determine the relative workloads of the respective raster threads. In addition, as will become more apparent below, HIP 212 is capable of distributing work to the raster threads, as well as reconfiguring the raster threads, by streaming commands to the raster threads. Both the performance data generated by the raster threads, and the work and reconfiguration commands from the HIP, may be communicated through the multi-threaded rendering pipeline 230, and more specifically, via the network-address based communications described above.

Figure 8:
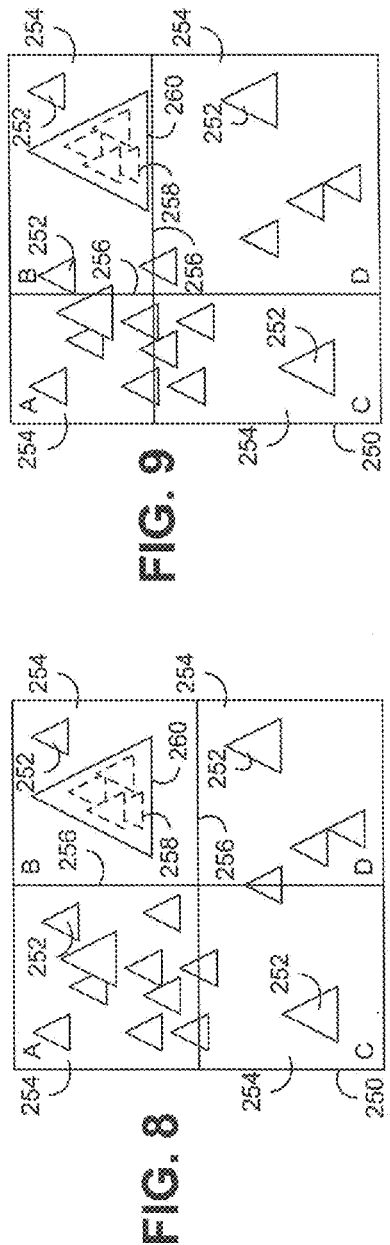
FIG. 8 is a diagram of an exemplary image space for a raster-based image rendered by the processing unit of FIG. 7, and showing an initial allocation of raster threads.

In the illustrated embodiment, HIP 212 is configured to dynamically reallocate regions of an image space to different raster threads to optimally balance the respective loads of the raster threads, typically be resizing the regions that are assigned to various raster threads and/or by reassigning regions to different raster threads. FIG. 8, for example, illustrates an exemplary image space 250 including a plurality of objects 252. Image space 250 is partitioned into four equally-sized regions designated A, B, C and D by boundary lines 256. For the purposes of this example, it may be assumed that four raster threads are respectively assigned to the four regions A, B, C and D.

Due to a number of factors, however, the respective workloads of the threads for regions A, B, C, and D may vary greatly. Region A, for example, includes a larger number of objects 252 than the other three regions. While in many cases the number of objects to be rasterized in a given region will be determinative of the relative workload of a thread assigned to that region, other factors may also affect the relative workload of a thread assigned to a particular region.

For example, region B is also illustrated as including a relatively large number of objects. However, several of these objects, designated at 258, are completely occluded behind another object 260, so any z-buffer filtering performed by a raster thread processing objects 258 will detect these objects as being hidden, and thus avert unnecessary rendering of those objects. Therefore, the relative workload of the thread assigned to that region would in practice be lower than might otherwise be expected based simply on the number of objects in the region.

In addition, other factors may also affect the workload of a particular raster thread. For example, culling algorithms based upon the placement of the viewpoint in a scene may exclude objects that are located out of the field of view. Other objects may be located off-screen, and thus, will not be rasterized.

Figure 9:
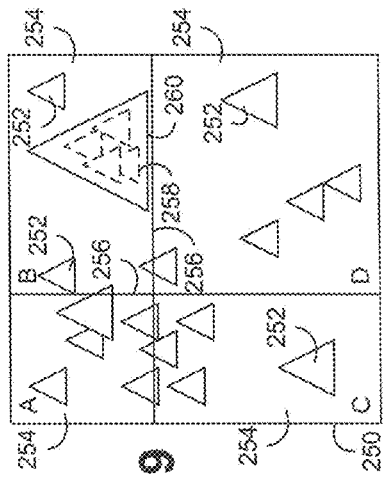
FIG. 9 is a diagram of the exemplary image space of FIG. 8, after dynamic performance-based reallocation of raster threads in a manner consistent with the invention.

Consistent with the invention, therefore, it is desirable to reallocate the mapping of regions to threads, e.g., by resizing the regions that are assigned to given raster threads. FIG. 9 illustrates a more efficient allocation of regions A, B, C and D to raster threads after dynamic reallocation of the regions in a manner consistent with the invention, whereby boundary lines 256 have been transposed to reduce the size of region A and increase the sizes of regions B, C and D. After the reallocation of these regions, the relative number of objects being rasterized by each thread is better balanced, resulting in more efficient processing by all raster threads.

It will be appreciated that in addition to or in lieu of resizing regions A, B, C and D, regions may be reassigned to different raster threads. For example, in an alternative example, two raster threads may be used to render image space 250, with one raster thread assigned to regions A and B and the other assigned to regions C and D. A dynamic reallocation to better balance the relative workloads of the threads may alternatively involve the reassignment of region B to the same thread that handles regions C and D.

It will also be appreciated that the manner in which regions are defined in an image space may vary in different embodiments. For example, regions may be defined by bounding shapes or bounding lines that define contiguous geometries. Regions may also be non-contiguous, and may, for example, be based upon one or more memory ranges. Regions may also be irregularly shaped.

Still further, in some embodiments, regions may be formed as regular tiles (e.g., square or rectangular tiles), with multiple regions assigned to a given raster thread. In such embodiments, reallocation of regions to threads may incorporate reassigning tiles to different threads.

In addition, while an image space is typically a two dimensional construct representing the space within which a raster-based image is rendered, and thus regions are two dimensional in nature, in some embodiments z coordinates (i.e., the coordinates tested against the z-buffer) may also be considered when allocating regions to raster threads. As such, regions may be considered in some embodiments as three dimensional geometries.

Figure 10:
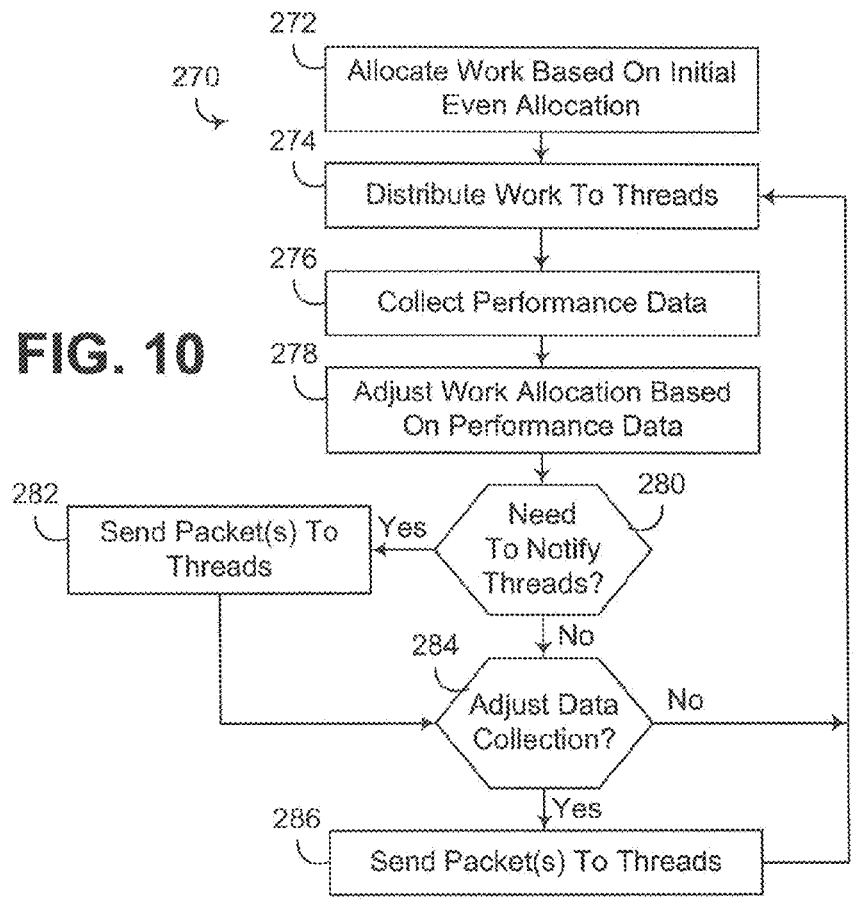
FIG. 10 is a flowchart illustrating the program flow of a dynamic reallocation routine executed by the host interface processor referenced in FIG. 7.
Figure 11:
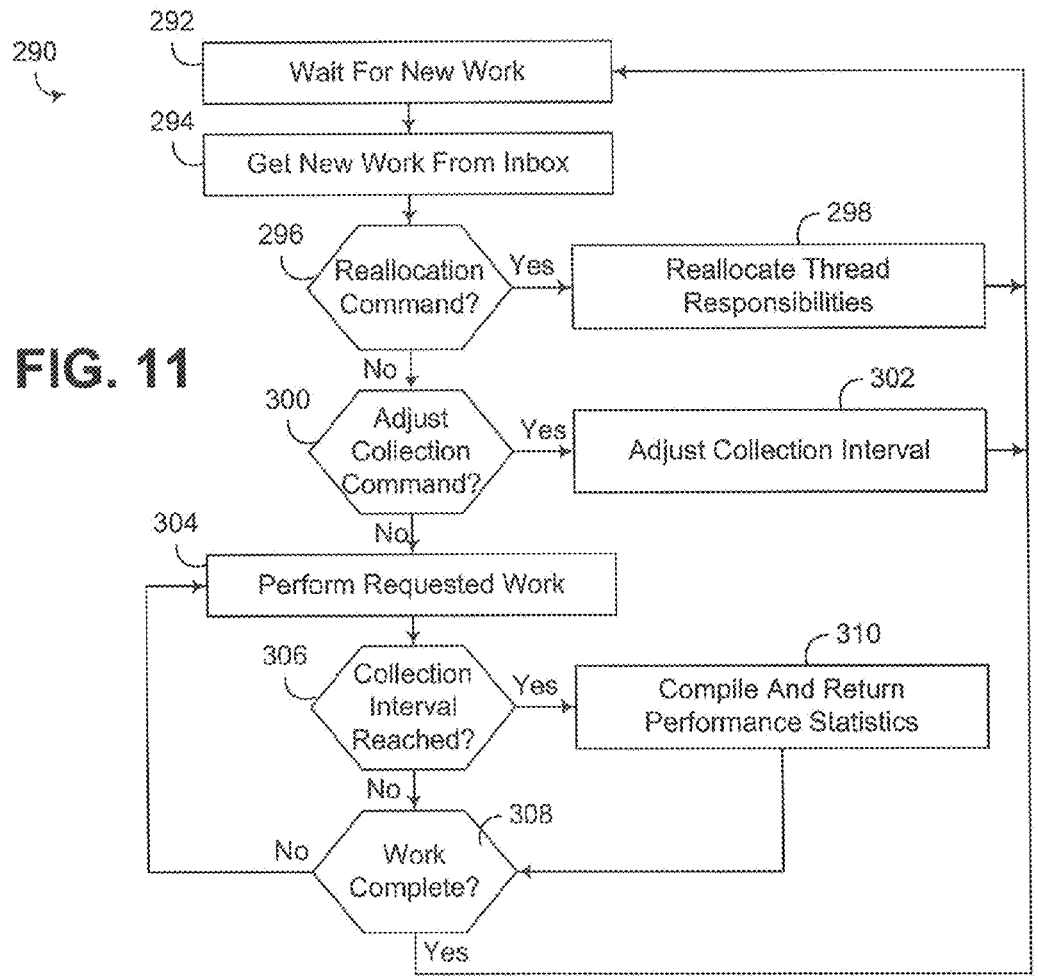
FIG. 11 is a flowchart illustrating the program flow of a work processing routine executed by one of the raster threads referenced in FIG. 7.

FIGS. 10 and 11 next illustrate exemplary routines 270, 290 that may be executed within multithreaded rendering pipeline 230 of FIG. 7 to implement dynamic performance-based reallocation consistent with the invention. In the illustrated embodiment, routine 270 is executed by a HIP 212, e.g., operating as a master thread, and is used to manage workflow to raster stages in the pipeline, operating as slave threads.

A HIP thread, operating as a master thread, manages reallocation by dynamically reallocating regions of an image space to different slave raster threads. The reallocation may occur at various intervals, e.g., every frame, every n frames, every object/primitive, every n objects/primitives, etc.

In some embodiments, the actual reallocation may be initiated in the master thread by controlling or configuring the work that is streamed through the pipeline to specific slave raster threads, e.g., so that a each raster thread only receives the work that is related to its assigned region. In other embodiments, however, separate instructions or commands may be streamed by a master thread to a slave raster thread to instruct the slave raster thread to locally control its own allocated region, such that the slave raster thread will limit its workload to its allocated region.

In addition, the slave raster threads are configured to return performance data to the master thread to enable the master thread to analyze current pipeline performance and reallocate regions to raster threads to maximize that performance. The type of performance data collected may vary in different embodiments, and may include, for example, z-buffer-related data, culling-related data, inbox utilization data, and off-screen-related data, among others. For example, it may be desirable to collect information regarding z-buffer fails, as a high number of z-buffer fails is indicative of a lower workload relative to the number of objects in a region. It may also be desirable to collect information regarding when an inbox is empty, or another indicator of when a raster thread otherwise has less to do than other raster threads. Information regarding culling or the placement of objects offscreen may also be collected. Furthermore, it may be desirable in some embodiments to enable a slave raster thread to notify a master thread whenever the slave raster thread determines that it will not be able to complete its assigned work by the required time (e.g., by the end of a frame). Other performance data, e.g., texture cache miss performance data, may also be collected consistent with the invention.

In addition, as will become more apparent below, in some embodiments the rate at which such performance data is returned by slave raster threads to a master thread may be configurable by the master thread by streaming additional commands to the slave raster threads via the software pipeline. The collection rate may occur at various intervals, e.g., every frame, every n frames, every object/primitive, every n objects/primitives, etc.

Turning to FIG. 10, routine 270 is a dynamic reallocation routine executed by HIP 212. Routine 270 begins in block 272 by initially allocating work among the various raster threads according to an initial, even allocation, e.g., by evenly dividing an image space into equally-sized regions. In addition, if separate commands are required to enable each raster thread to locally configure itself to handle its allocated region, commands may be streamed to the raster threads in this step.

Next, work is distributed to the raster threads in block 274 according to the initial allocation. Thereafter, the master thread waits for performance data to be returned from the raster threads in block 276, and based upon this performance data, the work allocation for the raster threads is reallocated based upon the performance data in block 278. Block 280 then determines whether the raster threads need to be notified of the reallocation (e.g., if the work allocation has changed and the embodiment requires notification of such to the raster threads), and if so, control passes to block 282 to send packets to all affected raster threads notifying the raster threads of the reallocation. After completion of block 282, or if no threads need to be notified in block 280, control passes to block 284 to determine whether it is desirable to adjust the data collection interval. If not, control returns to block 274 to distribute additional work. If the data collection needs to be changed for one or more of the raster threads, block 284 passes control to block 286 to send packets to the affected requesting that those threads use a different data collection interval.

It may be desirable, for example, to collect data more or less frequently based upon application instructions, or based upon monitoring of the effectiveness of dynamic reallocation. If, for example, the allocation lacks sufficient responsiveness to accommodate fast moving scenes, more frequent data collection, and more frequent reallocation, may result in better performance.

It will be appreciated that the rate at which data is collected, the rate at which work is distributed, and the rate at which reallocation is performed may vary in different embodiments. For example, it may be desirable to reallocate workload on frame boundaries, but to collect performance data and distributed packets of work on a more frequent basis.

FIG. 11 next illustrates routine 290, which functions as a work processing routine executed by a raster thread. Routine 290 begins in block 292 by waiting for new work, i.e., a new command packet, from HIP 212, or alternatively, from an earlier stage in the software pipeline. Upon being notified of new work in the inbox, control passes to block 294 to get the new work. Block 296 then determines whether the new work is a reallocation command, providing a notification to the raster thread of a new region to which the raster thread is reallocated. If so, control passes to block 292 to reallocate the raster thread's responsibilities, prior to returning control to block 292 to enable the thread to wait for new work.

Otherwise, block 296 passes control to block 300 to determine whether the new work is an adjust collection command, requesting that the data collection interval for the thread be adjusted. If so, control passes to block 302 to adjust the collection interval and return to block 292.

Otherwise, block 300 passes control to block 304 to perform the requested work. While the work is being performed, block 306 periodically checks whether the collection interval has been reached and block 308 periodically determines whether the work is complete. If the collection interval is reached, block 306 passes control to block 310 to compile the desired performance statistics and return those statistics to HIP 212, before passing control to block 308 to determine whether the work is complete. Once the work is complete, block 308 returns control to block 292 to await further work.

Therefore, through a dynamic, performance-based, closed-loop process, HIP 212, operating as a master thread, is able to dynamically maintain optimum region-to-raster thread mappings to balance the workload among a plurality of raster threads.

Various modifications may be made consistent with the invention. For example, various numbers of regions may be defined in a given image space. Moreover, it may not be desirable to maintain a one-to-one mapping between raster threads and regions of an image space, and as such, pools of threads may be allocated to a given region in some embodiments, while in other embodiments, a single thread may be allocated to multiple regions. In addition, the numbers of threads assigned to a given region may also be varied dynamically, such that a reallocation involves both the resizing of a region and the number of threads assigned to that region.

Various other modifications may be made without departing from the spirit and scope of the invention. Therefore, the invention lies in the claims hereinafter appended.

What is claimed is:

1. A circuit arrangement, comprising:
    hardware logic configured to host a multithreaded rendering software pipeline using a plurality of parallel threads of execution, the multithreaded rendering software pipeline including a rasterization backend that generates a raster-based image, the plurality of parallel threads of execution including a plurality of raster threads that execute at least a portion of the rasterization backend, wherein each raster thread is allocated at least one region of an image space for the raster-based image; and
    control logic configured to dynamically reallocate regions allocated to the plurality of raster threads based upon performance data collected from the plurality of raster threads, wherein the control logic is further configured to control an interval at which the dynamic reallocation occurs based on the performance data collected from the plurality of raster threads;
    wherein each raster thread is configured to collect performance data associated with a workload of such raster thread and return the performance data to the control logic, wherein each raster thread is configured to return at least a portion of the performance data according to a data collection interval, and wherein the control logic is configured to adjust the data collection interval by streaming a command to at least one raster thread via the multithreaded rendering software pipeline.

2. The circuit arrangement of claim 1, wherein the control logic is configured to dynamically reallocate the regions by resizing at least one region allocated to at least one raster thread.

3. The circuit arrangement of claim 1, wherein the control logic is configured to dynamically reallocate the regions by transferring the allocation of at least one region from a first raster thread to a second raster thread.

4. The circuit arrangement of claim 1, wherein the control logic is configured to dynamically reallocate the regions by streaming at least one notification to at least one raster thread such that the at least one raster thread locally reconfigures its region allocation.

5. The circuit arrangement of claim 4, wherein the control logic is configured to stream the at least one notification via the multithreaded rendering software pipeline.

6. The circuit arrangement of claim 1, wherein the control logic is configured to dynamically reallocate the regions by configuring work that is streamed to the plurality of raster threads via the multithreaded rendering software pipeline.

7. The circuit arrangement of claim 1, wherein the data collection interval is different from the interval at which the dynamic reallocation occurs.

8. The circuit arrangement of claim 7, wherein at least one raster thread is configured to collect the performance data by collecting z-buffer-related data.

9. The circuit arrangement of claim 7, wherein at least one raster thread is configured to collect the performance data by collecting culling-related data.

10. The circuit arrangement of claim 7, wherein at least one raster thread is configured to collect the performance data by collecting inbox utilization data.

11. The circuit arrangement of claim 7, wherein at least one raster thread is configured to collect the performance data by collecting offscreen-related data.

12. The circuit arrangement of claim 7, wherein at least one raster thread is configured to collect the performance data by determining when such raster thread is incapable of finishing assigned work within a given interval.

13. The circuit arrangement of claim 1, wherein each raster thread is configured to return the performance data to the control logic via the multithreaded rendering software pipeline.

14. The circuit arrangement of claim 1, wherein the control logic is configured to control the data collection interval independently from the interval at which the dynamic reallocation occurs.

15. An integrated circuit device including the circuit arrangement of claim 1.

16. A program product comprising a non-transitory computer readable medium and logic definition program code resident on the non-transitory computer readable medium and defining the circuit arrangement of claim 1.

17. A method of rendering an image using a multithreaded rendering software pipeline of the type using a plurality of parallel threads of execution, the method comprising:
- generating a raster-based image using a plurality of raster threads from a rasterization backend implemented in the multithreaded rendering software pipeline, wherein each raster thread is allocated at least one region of an image space for the raster-based image;
- dynamically reallocating regions allocated to the plurality of raster threads based upon performance data collected from the plurality of raster threads;
- controlling an interval at which the dynamic reallocation occurs based on the performance data collected from the plurality of raster threads;
- with each raster thread, collecting performance data associated with a workload of such raster thread and returning the performance data to a master thread, wherein each raster thread is configured to return at least a portion of the performance data according to a data collection interval; and
- adjusting the data collection interval by streaming a command to at least one raster thread via the multithreaded rendering software pipeline.

18. The method of claim 17, wherein dynamically reallocating the regions includes resizing at least one region allocated to at least one raster thread.

19. The method of claim 17, wherein dynamically reallocating the regions includes transferring the allocation of at least one region from a first raster thread to a second raster thread.

20. The method of claim 17, wherein dynamically reallocating the regions includes streaming at least one notification to at least one raster thread such that the at least one raster thread locally reconfigures its region allocation.

21. The method of claim 17, wherein dynamically reallocating the regions includes configuring work that is streamed to the plurality of raster threads via the multithreaded rendering software pipeline.

22. The method of claim 17, wherein collecting performance data includes at least one of collecting z-buffer-related data, collecting culling-related data, collecting inbox utilization data, collecting offscreen-related data, and determining when a raster thread is incapable of finishing assigned work within a given interval.

23. A method of rendering an image using a multithreaded rendering software pipeline of a type using a plurality of parallel threads of execution, the method comprising:
- generating a raster-based image using a plurality of raster threads from a rasterization backend implemented in the multithreaded rendering software pipeline, wherein each raster thread is allocated at least one region of an image space for the raster-based image;
- dynamically reallocating regions allocated to the plurality of raster threads based upon performance data collected from the plurality of raster threads, wherein each raster thread of the plurality of raster threads is configured to return performance data associated with the raster thread according to a data collection interval;
- determining whether to adjust the data collection interval of at least one raster thread of the plurality of raster threads based at least in part on the performance data collected from the plurality of raster threads;
- in response to determining to adjust the data collection interval, adjusting the data collection interval for the at least one raster thread by streaming a command to the at least one raster thread via the multithreaded rendering software pipeline; and
- controlling an interval at which the dynamic reallocation occurs based on the performance data collected from the plurality of raster threads, wherein the interval at which the dynamic reallocation occurs is based at least in part on a number of objects for at least one region of the image space.

* * * * *